(No Model.)
J. S. SURBAUGH.
FLEXIBLE HANDLE FOR TOOLS.
No. 479,032. Patented July 19, 1892.
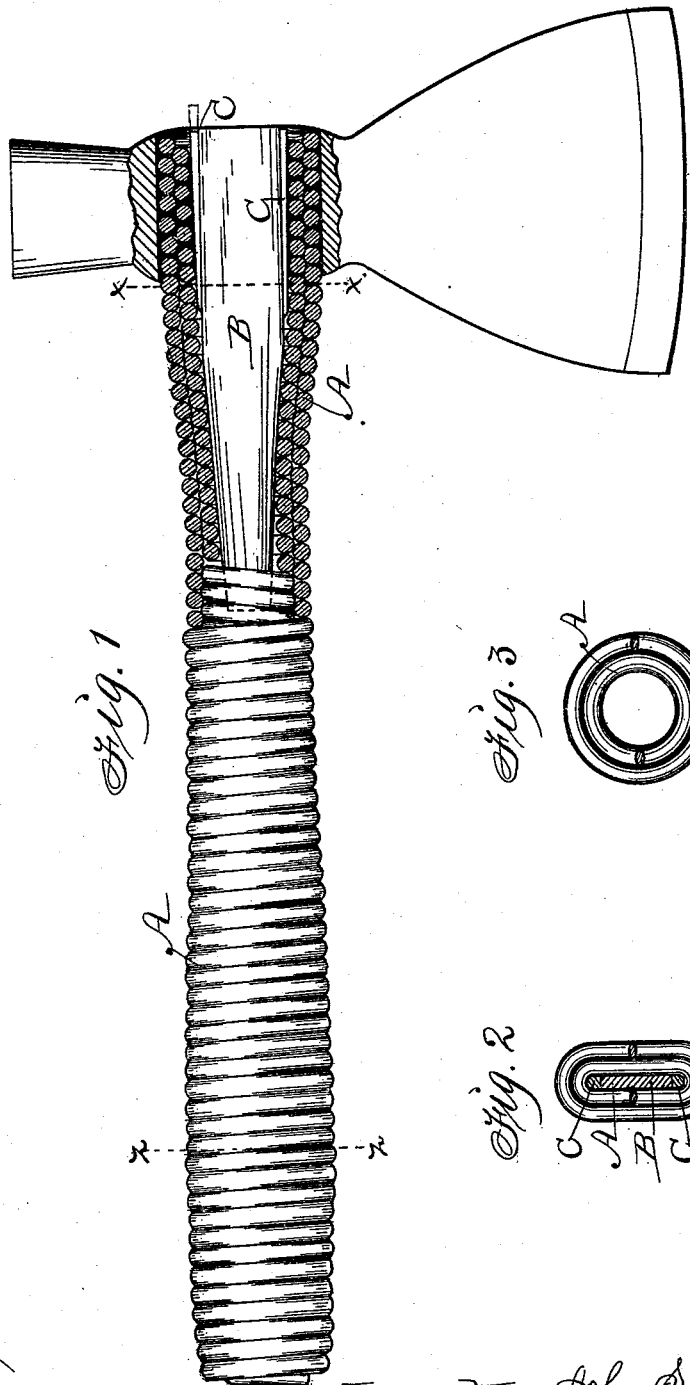

UNITED STATES PATENT OFFICE.

JOHN S. SURBAUGH, OF OTTUMWA, IOWA.

FLEXIBLE HANDLE FOR TOOLS.

SPECIFICATION forming part of Letters Patent No. 479,032, dated July 19, 1892.

Application filed August 10, 1891. Serial No. 402,215. (No model.)

*To all whom it may concern:*

Be it known that I, JOHN S. SURBAUGH, a citizen of the United States of America, residing at Ottumwa, in the county of Wapello and State of Iowa, have invented a new and useful Flexible Handle for Tools, Hammers, &c., of which the following is a specification.

My object is to provide a strong, durable, and flexible metal handle for hammers, hatchets, and various other tools that have eyes for inserting the end of a handle and fastening it therein; and my invention consists in a tool-handle made of wire, as hereinafter set forth, pointed out in my claims, and illustrated in the accompanying drawings, in which—

Figure 1 is a side view of my flexible metal handle and a hatchet to which the handle is fixed as required for practical use. Fig. 2 is a transverse sectional view through the line $x\ x$ of Fig. 1, showing the coils flattened, as required, to adapt the end of the handle to be fixed in the eye of a tool. Fig. 3 is a view through the line $z\ z$ of Fig. 1 and shows two coils in concentric position.

To make a flexible wire handle, I simply coil a wire A closely to produce the length desired and then drive a piece of solid metal B in one end to change the coils into oblong or oval shape to reinforce and stiffen and shape that end of the coil to adapt it to be inserted and fastened in the eye of a tool. The solid-metal part B may vary in shape and size, as required, to suit tools differing in shape and weight.

In making handles for some tools two or more coils may be wrapped upon each other, as shown in the drawings, to produce a strong and heavy handle. The solid-metal part B may be flexible and extend the entire length of the handle, or only part way, as required, to regulate the strength, weight, and flexibility of the handle. The end of the coil (or concentric coils) that is to be adapted in shape to fill the eye of a tool is pressed and flattened and shaped by means of a die and press, or in any suitable way, as required, to make it solid and to conform in shape with the space it is to enter and fill in a tool.

To fasten the handle in a tool, I drive in wedges C between the plug B and the wire to expand the end of the handle.

I claim as my invention—

1. As an improved article of manufacture, a handle for striking-tools, consisting of a length of coiled wire having its one end adapted in shape to enter the eye of a tool, and means for securing it therein, for the purposes stated.

2. A handle for striking-tools, consisting of a length of coiled wire having its one end adapted in shape to enter the eye of a tool, and a plug adapted to enter the end of the handle when in the eye of the tool, and means for jointly fastening the end of the handle and the plug within the eye of the tool.

3. A tool-handle consisting of two or more concentric coils of wire and a solid-metal filling in the inner coil, substantially as set forth, for the purposes stated.

JOHN S. SURBAUGH.

Witnesses:
J. F. BLAKE,
G. E. HOWARD.